US009277245B2

(12) United States Patent
Sole et al.

(10) Patent No.: US 9,277,245 B2
(45) Date of Patent: Mar. 1, 2016

(54) METHODS AND APPARATUS FOR CONSTRAINED TRANSFORMS FOR VIDEO CODING AND DECODING HAVING TRANSFORM SELECTION

(75) Inventors: Joel Sole, La Jolla, CA (US); Xiaoan Lu, Princeton, NJ (US); Peng Yin, Ithaca, NY (US); Qian Xu, Folsom, CA (US); Yunfei Zheng, San Diego, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 733 days.

(21) Appl. No.: 13/583,338

(22) PCT Filed: Mar. 4, 2011

(86) PCT No.: PCT/US2011/000420
§ 371 (c)(1),
(2), (4) Date: Sep. 7, 2012

(87) PCT Pub. No.: WO2011/112239
PCT Pub. Date: Sep. 15, 2011

(65) Prior Publication Data
US 2013/0051453 A1 Feb. 28, 2013

Related U.S. Application Data

(60) Provisional application No. 61/312,465, filed on Mar. 10, 2010.

(51) Int. Cl.
*H04N 7/30* (2006.01)
*H04N 19/86* (2014.01)
(Continued)

(52) U.S. Cl.
CPC .............. *H04N 19/86* (2014.11); *H04N 19/12* (2014.11); *H04N 19/122* (2014.11); *H04N 19/147* (2014.11); *H04N 19/176* (2014.11); *H04N 19/46* (2014.11)

(58) Field of Classification Search
CPC . H04N 7/50; H04N 7/26244; H04N 7/26271; H04N 7/26053; H04N 7/26941; G10L 19/0212; G10L 19/008; G10L 19/022; G10L 21/02; G10L 19/16; G10L 2021/02166; G10L 19/24; G10L 19/02; G10L 19/0204; G10L 19/0017; G10L 19/04; G10L 19/06; G10L 19/12; G10L 19/20
See application file for complete search history.

(56) References Cited

U.S. PATENT DOCUMENTS

2002/0110280 A1* 8/2002 Prakash ................. H04N 19/50
382/240
2004/0125204 A1* 7/2004 Yamada ............... H04N 19/197
348/97

(Continued)

FOREIGN PATENT DOCUMENTS

CN 1968419 5/2007
JP 2003-204550 A 7/2003
(Continued)

OTHER PUBLICATIONS

Lim et al., "Interger Sine Transform for Inter Frame," ITU—Telecommunications Standardization Sector, Study Group 16 Question 6, Video Coding Experts Group (VCEG), Doc.: VCEG-AJ12, 36th Meeting, San Diego, CA, Oct. 8-10, 2008, pp. 1-6.

(Continued)

*Primary Examiner* — Sath V Perungavoor
*Assistant Examiner* — Howard D Brown, Jr.
(74) *Attorney, Agent, or Firm* — Robert D. Shedd; Ronald J. Kolczynski

(57) ABSTRACT

Methods and apparatus are provided for constrained transforms for video coding and decoding having transform selection. An apparatus includes a video encoder for encoding at least a block in a picture by selecting a particular transform from at least a first transform and a second transform that is different than the first transform, and applying the particular transform to a residue of the block. Transform coefficients for the second transform are selected responsive to a deblocking filter that is present in the video encoder.

29 Claims, 6 Drawing Sheets

(51) Int. Cl.
*H04N 19/176* (2014.01)
*H04N 19/147* (2014.01)
*H04N 19/46* (2014.01)
*H04N 19/122* (2014.01)
*H04N 19/12* (2014.01)
*G06K 9/36* (2006.01)

(56) References Cited

U.S. PATENT DOCUMENTS

| | | | | |
|---|---|---|---|---|
| 2005/0156775 A1* | 7/2005 | Petre | ............... | H03M 1/121 341/155 |
| 2007/0110327 A1 | 5/2007 | Han | | |
| 2008/0101720 A1* | 5/2008 | Wang | ............... | H04N 19/176 382/275 |
| 2009/0097571 A1 | 4/2009 | Yamada et al. | | |
| 2009/0238271 A1* | 9/2009 | Kim | ............... | H04N 19/176 375/240.12 |
| 2010/0253494 A1 | 10/2010 | Inoue | | |
| 2011/0206289 A1* | 8/2011 | Dikbas | ............... | H04N 19/00484 382/238 |
| 2011/0293002 A1* | 12/2011 | Sole | ............... | H04N 19/197 375/240.12 |
| 2012/0057630 A1* | 3/2012 | Saxena | ............... | H04N 19/105 375/240.03 |
| 2012/0201462 A1* | 8/2012 | Chang | ............... | H04N 19/147 382/190 |
| 2013/0107940 A1* | 5/2013 | Sato | ............... | H04N 19/00109 375/240.02 |
| 2013/0287309 A1* | 10/2013 | Sato | ............... | G06T 9/20 382/232 |
| 2013/0300591 A1* | 11/2013 | Marpe | ............... | H03M 7/40 341/67 |
| 2015/0215574 A1* | 7/2015 | Hinds | ............... | H04N 19/00 348/441 |

FOREIGN PATENT DOCUMENTS

| | | |
|---|---|---|
| JP | 2004-032299 A | 1/2004 |
| JP | 2009272727 A | 11/2009 |
| JP | 2012-516625 A | 7/2012 |
| WO | 2008/035842 A1 | 3/2008 |
| WO | 2008/157360 A2 | 12/2008 |
| WO | WO2009021062 | 2/2009 |
| WO | 2009/072366 A1 | 6/2009 |
| WO | WO2010087807 | 8/2010 |

OTHER PUBLICATIONS

Chen et al., "Structurally regular biorthogonal filter banks: theory, designs and applications", IEEE International Symposium on Communications and Information Technology, Oct. 26-29, 2004, vol. 1, pp. 184-189.

Fu et al., "Diagonal Discrete Cosine Transforms for Image Coding", Jan. 1, 2006, Lecture Notes in Computer Science, Springer, Berlin. DE, pp. 150-158.

Li et al., "A class of smooth block transforms and applications in image compression", Proceedings of the SPIE—Image and Video Compression, Feb. 9-10, 1994, vol. 2186, pp. 174-184.

Malvar, "Biorthogonal and Nonuniform Lapped Transforms for Transform Coding with Reduced Blocking and Ringing Artifacts", IEEE Transactions on Signal Processing, Apr. 1, 1998, vol. 46, No. 4.

Malvar et al., "The Lot: Transform Coding Without Blocking Effects", IEEE Transactions on Acoustics, Speech and Signal Processing, Apr. 1, 1989, vol. 37, No. 4, pp. 553-559.

Yeo et al., "Choice of tmasforms in MDDT for unified intra prediction", 94. MPEG Meeting Guangzhou, Oct. 11-15, 2010, (MPEG or ISO/IEC JTC1/SC29/WG11), Oct. 28, 2010.

Zhao et al., "Rate-Distortion Optimized Transform", 90. MPEG Meeting, Oct. 26-30, 2010, Nov. 2, 2009, pp. 1-2.

Iain et al., "Dynamic Transform Replacement in an H.264 Codec", IEEE International Conference on Image Processing, Oct. 12, 2008. pp. 2108-2111.

Sezer et al., "Sparse Orthonormal Transforms for Image Compression," 15th IEEE Int'l Conference on Image Processing, 2008 (ICIP 2008) Oct. 12-15, 2008, pp. 149-152.

Urhan et al., "Parameter Embedding Mode and Optimal Post-Process Filtering for Improved WDCT Image Compression," IEEE Transactions on Circuits and Systems for Video Technology, vol. 18, No. 4, pp. 528-532, Apr. 2008.

Ye et al., "Improved Intra Coding," ITU Study Group 16 Question 6, Video Coding Experts Group (VCEG), Doc.: VCEG-AG11, 33rd Meeting Shenzhen, China, Oct. 20, 2007, pp. 1-6.

Narroschke et al., "Adaptive prediction error coding in spatial and frequency domain with a fixed scan in the spatial domain," ITU Study Group 16 Question 6, Video Coding Experts Group (VCEG), Doc.: VCEG-A07, 30th Meeting Hangzhou, China, Oct. 23-27, 2006, pp. 1-15.

ITU-T H.264, "Series H: Audiovisual and Multimedia Systems, Infrastructure of audiovisual services—Coding of moving video," Advanced video coding for generic audiovisual servicesm ITU-T Recommendation H.264, 343 pages, Mar. 2005.

Cho et al., "Warped Discrete Cosine Transform and Its Appiication in Image Compression," IEEE Transactions on Circuits and Systems for Video Technology, vol. 10, No. 8, Dec. 2000, pp. 1364-1373.

\* cited by examiner

METHODS AND APPARATUS FOR CONSTRAINED TRANSFORMS FOR VIDEO CODING AND DECODING HAVING TRANSFORM SELECTION

CROSS-REFERENCE TO RELATED APPLICATIONS

This application is a National Stage Application and claims the benefit, under 35 U,S.C. §365 of International Application PCT/US2011/000420 filed Mar. 4, 2011 which was published in accordance with PCT Article 21(2) on Sep. 15, 2011 in English and which claims the benefit of United States Provisional Patent Application No. 61/312,465 filed on Mar. 10, 2010.

TECHNICAL FIELD

The present principles relate generally to video encoding and decoding and, more particularly, to methods and apparatus for constrained transforms for video coding and decoding having transform selection.

BACKGROUND

The block-based discrete transform is a fundamental component of many image and video compression standards including the Joint Photographic Experts Group (JPEG), the International Organization for Standardization/International Electrotechnical Commission (ISO/IEC) Moving Picture Experts Group-1 (MPEG-1) Standard, the ISO/IEC MPEG-2 Standard, the ISO/IEC MPEG-4 Standard, the International Telecommunication Union, Telecommunication Sector (ITU-T) H.263 Recommendation, and the ISO/IEC MPEG-4 Part 10 Advanced Video Coding (AVC) Standard/ITU-T H.264 Recommendation (hereinafter the "MPEG-4 AVC standard"), and so forth, and is used in a wide range of applications.

The discrete cosine transform (DCT) is the most extensively used block transform. The DCT scheme takes advantage of the local spatial correlation property of an image/frame by dividing the image/frame into blocks of pixels (usually 4×4 and 8×8), transforming each block from the spatial domain to the frequency domain using the discrete cosine transform and quantizing the DCT coefficients. Most image and video compression standards use a fixed two-dimensional (2-D) separable DCT block transform. If several block sizes are allowed (typically, from 4×4 to 16×16 blocks), then the DCT with the size corresponding to the block is used. Nonetheless, there is only one possible transform for each block size.

However, the image and video content has data with varying statistics and properties. Therefore, there are potential compression gains if several transforms could be used for each block, selecting for each situation the most favorable transform within a range of options. In the image and video coding standards such as, for example, the MPEG-4 AVC Standard, there is only one choice for the block transform to use for each block size. Thus, there is no selection of the transform.

There have been some prior proposals for the use of multiple transforms in a single coding scheme. The Karhunen Loeve Transform (KLT) is an optimal linear transform described in a first prior art. KLT is employed in the first prior art approach to derive the best transform for each of the 9 intra prediction modes in the MPEG-4 AVC Standard. The statistics for each mode are extracted and the corresponding KLTs are derived. Each intra prediction residual is encoded with its KLT. The 9 intra modes partition the data space effectively in such a way that the DCT is no longer close to the best transform, so a distinctive best transform can be derived and successfully applied. To sum up, the first prior art approach uses several transforms, but each of them is fixed to the intra prediction mode selected.

A second prior art approach proposes to modify the DCT transform to several frequencies, that is, changing the basis functions with different all-pass filters to attain a variety of warped frequency responses. The resulting transforms are called warped DCT (WDCT). An exhaustive rate distortion (R-D) search is performed for each block and the selected transform is indicated with side information. The idea is applied to image compression. A third prior art approach describes using the WDCT and embedding the transform selection within the transformed coefficients themselves. The third prior art approach shows good performance for low-bit rate image compression. Also, the third prior art approach adds a post-filtering step that minimizes the mean square error (MSE). The filter is determined at the encoder and multiplexed into the bit-stream.

A fourth prior art approach proposes an algebraic optimization of a set of transforms for a large database. The set is partitioned iteratively until the set reaches a stable point in which each transform is sparse-optimal for its particular subset of data. The encoder indicates through a quad-tree which transform is used in each block. Thus, the transform choice is not obtained independently for each block.

A fifth prior art approach proposes an integer sine transform (IST) for inter frame residues. An inter frame residue has low correlation, and the DCT is adequate only for highly correlated data. Therefore, the fifth prior art approach proposes a sine transform, which is efficient for data with correlation from −0.5 to 0.5. The KLT coincides with the sine transform in part of this range. The IST is derived from the sine transform in exactly the same way as the integer cosine transform in the MPEG-4 AVC Standard. The fifth prior art approach has implemented 4×4 and 8×8 IST versions. The same transform is applied for the whole macroblock, sending a flag, unless the macroblock is divided into 4 sub-macroblocks, in which case 4 flags are sent indicating the transform employed in each sub-macroblock.

A sixth prior art approach proposes a scheme similar to that proposed in the fifth prior art approach. The sixth prior art approach proposes an adaptive prediction error coding (APEC) coding scheme that enables adaptive prediction error coding in the spatial and frequency domain. For each block of the prediction error, either transform coding or spatial domain coding is applied. The algorithm with a lower rate-distortion (RD) cost is chosen.

These approaches propose a limited range of choice of the best transform and do not fully exploit the generality of the concept.

We have previously disclosed and described a more general and broader approach that includes alternatives not considered in the aforementioned prior art. These concepts are disclosed with respect to a seventh prior art approach and an eighth prior art approach. The seventh and eighth prior art approaches describe the use of a set of transforms (two or more transforms) and then encode an image or video choosing the best transform of the set for each region, slice, block or macroblock. The set of transforms may be optimized or designed for a range of statistics or image/video patterns. In practice, one of the transforms is the DCT. A problem then arises on what alternative transforms should be in the set that work well along with the DCT. Different methods to obtain the alternative transforms are outlined in the seventh and eighth prior art approaches and include, for example, training a set and obtaining the corresponding KLT by sparsity-based methods, and so forth. However, these methods either try to optimize an objective metric, like the peak signal to noise ratio (PSNR) or BD-rate (Bjontegaard bit rate savings), or use basic alternatives like the DST (Discrete Sine Transform), but they do not consider the subjective quality of the encoded sequences.

We have observed that sequences encoded with a transform selection method (even though improving the PSNR) might suffer from a new artifact which we call "windowed pattern". The pattern is mainly found at low bit-rates and can be annoying.

SUMMARY

These and other drawbacks and disadvantages of the prior art are addressed by the present principles, which are directed to methods and apparatus for constrained transforms for video coding and decoding having transform selection.

According to an aspect of the present principles, there is provided an apparatus. The apparatus includes a video encoder for encoding at least a block in a picture by selecting a particular transform from at least a first transform and a second transform that is different than the first transform, and applying the particular transform to a residue of the block. Transform coefficients for the second transform are selected responsive to a deblocking filter that is present in the video encoder.

According to another aspect of the present principles, there is provided a method in a video encoder. The method includes encoding at least a block in a picture by selecting a particular transform from at least a first transform and a second transform that is different than the first transform, and applying the particular transform to a residue of the block. Transform coefficients for the second transform are selected responsive to a deblocking filter that is present in the video encoder.

According to yet another aspect of the present principles, there is provided an apparatus. The apparatus includes a video decoder for decoding at least a block in a picture by receiving transform coefficients and a transform indicator for the block, the transform indicator for indicating which of at least a first transform and a second transform that is different than the first transform was used to encode the block, and applying one of the first and the second transforms as indicated by the transform indicator to a residue of the block. Transform coefficients for the second transform are determined responsive to a deblocking filter that is present in the video decoder.

According to still another aspect of the present principles, there is provided a method in a video decoder. The method includes decoding at least a block in a picture by receiving transform coefficients and a transform indicator for the block. The transform indicator is for indicating which of at least a first transform and a second transform that is different than the first transform was used to encode the block. The method further includes applying one of the first and the second transforms as indicated by the transform indicator to a residue of the block. Transform coefficients for the second transform are determined responsive to a deblocking filter that is present in the video decoder.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
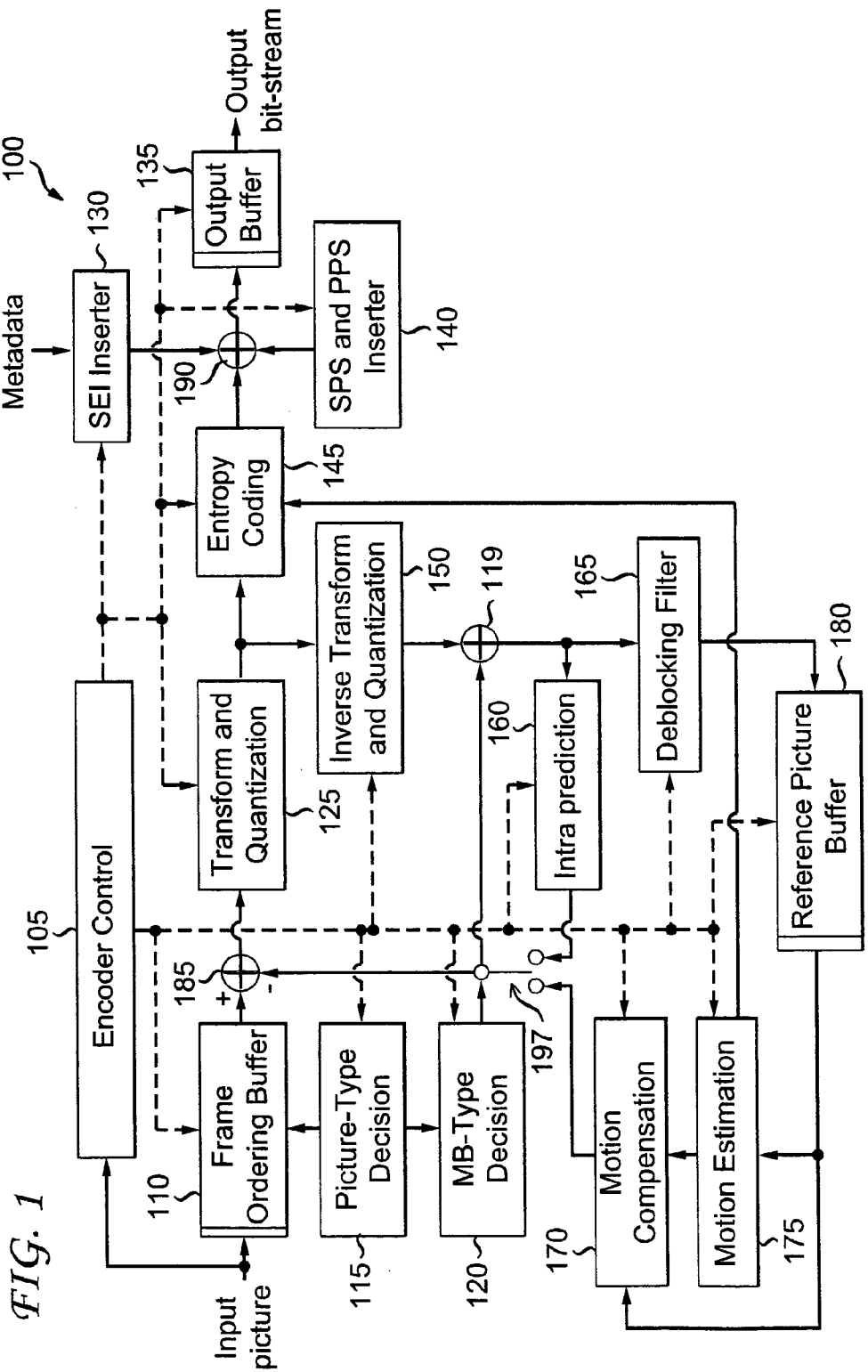
FIG. 1 is a block diagram showing a video encoder capable of performing video encoding in accordance with the MPEG-4 AVC Standard.

The present principles are directed to methods and apparatus for constrained transforms for video coding and decoding having transform selection.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Also, as used herein, the words "picture" and "image" are used interchangeably and refer to a still image or a picture from a video sequence. As is known, a picture may be a frame or a field.

Turning to FIG. 1, a video encoder capable of performing video encoding in accordance with the MPEG-4 AVC Standard is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
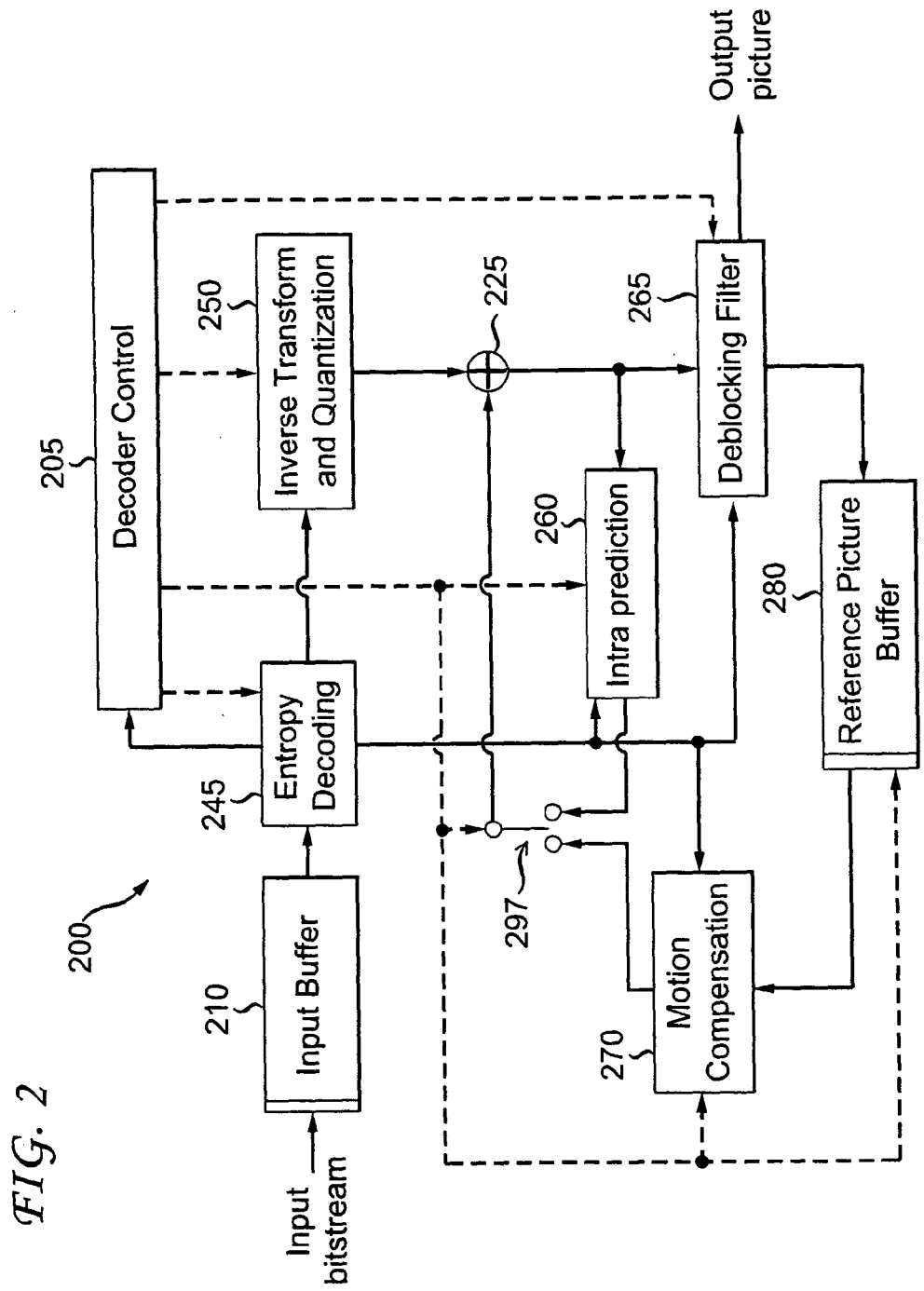
FIG. 2 is a block diagram showing a video decoder capable of performing video decoding in accordance with the MPEG-4 AVC Standard.

Turning to FIG. 2, a video decoder capable of performing video decoding in accordance with the MPEG-4 AVC Standard is indicated generally by the reference numeral 200. The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

We note that there is no transform selection performed in the encoder of FIG. 1 or the decoder of FIG. 2.

Figure 3:
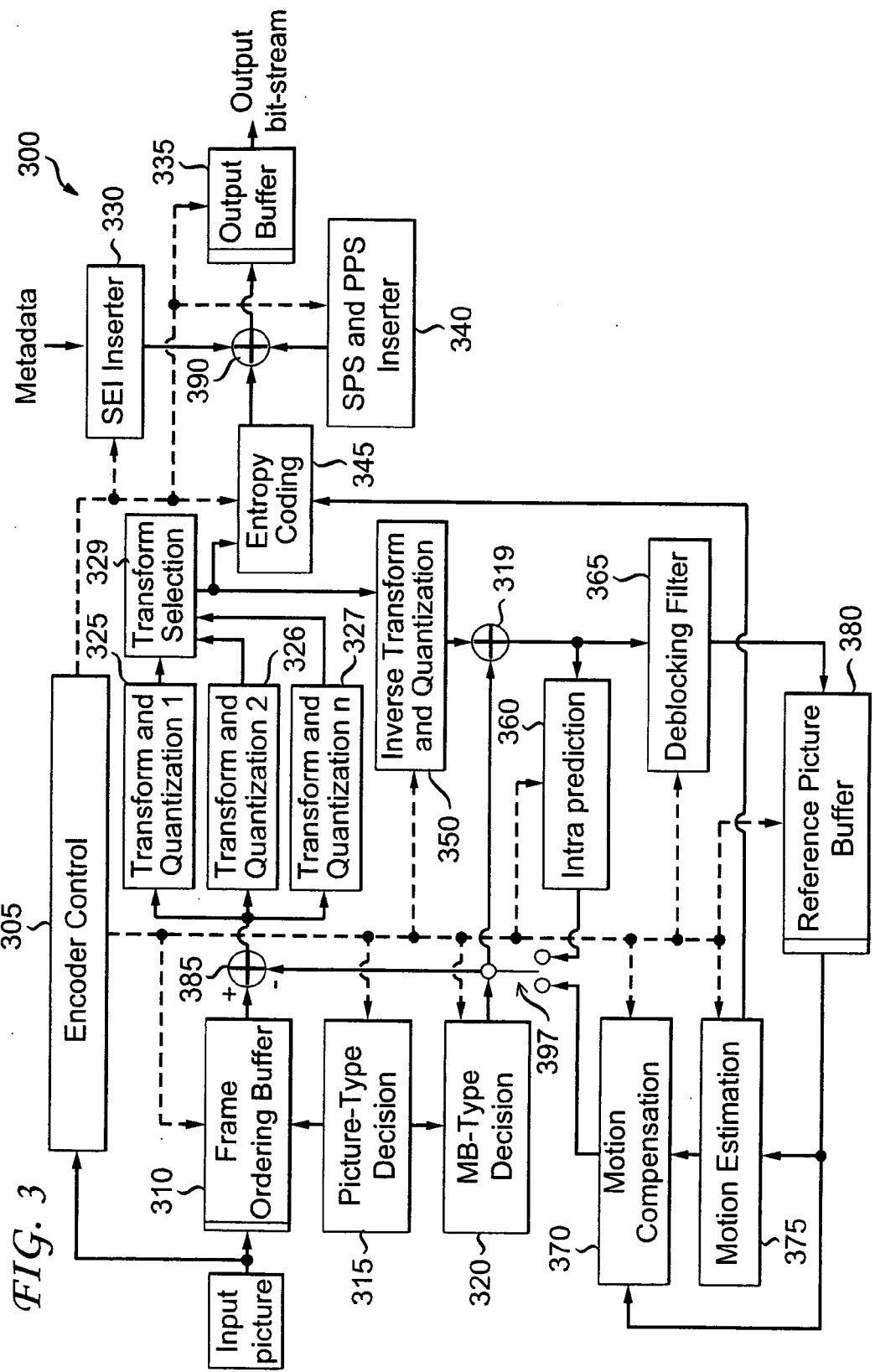
FIG. 3 is a block diagram showing an exemplary video encoder with transform selection, in accordance with an embodiment of the present principles.

Turning to FIG. 3, an exemplary video encoder with transform selection is indicated generally by the reference numeral 300. The video encoder 300 includes a frame ordering buffer 310 having an output in signal communication with a non-inverting input of a combiner 385. An output of the combiner 385 is connected in signal communication with an input of a transformer and quantizer 1 325, an input of a transformer and quantizer 2 326, and an input of a transformer and quantizer n 327. An output of the transformer and quantizer 1 325 is connected in signal communication with a first input of a transform selector 329. An output of the transformer and quantizer 2 326 is connected in signal communication with a second input of the transform selector 329. An output of the transformer and quantizer n 327 is connected in signal communication with a third input of the transform selector 329. An output of the transform selector 329 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397.

An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 300, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
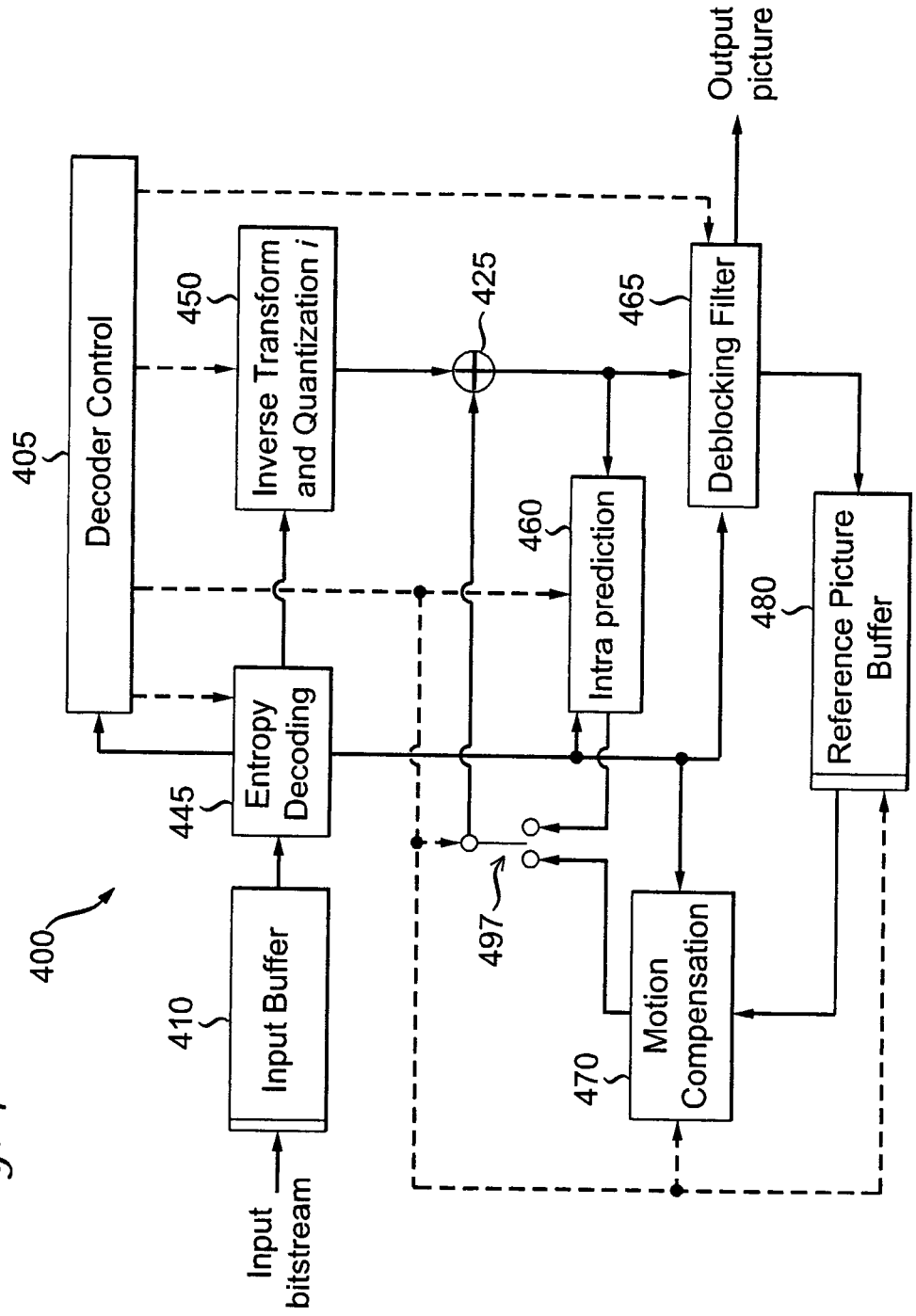
FIG. 4 is a block diagram showing an exemplary video decoder, in accordance with an embodiment of the present principles.

Turning to FIG. 4, an exemplary video decoder with transform selection is indicated generally by the reference numeral 400. The video decoder 400 includes an input buffer 410 having an output connected in signal communication with a first input of the entropy decoder 445. A first output of the entropy decoder 445 is connected in signal communication with a first input of an inverse transformer and inverse quantizer i 450. An output of the inverse transformer and inverse quantizer i 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470 and a first input of the deblocking filter 465. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer i 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for constrained transforms for video coding and decoding having transform selection. The methods and apparatus in accordance with the present principles advantageously are directed to the aforementioned "windowed pattern", a new artifact that has been observed in sequences encoded with the transform selection methods (even through improving the PSNR). As noted above, the pattern is mainly found at low bit-rates and can be annoying.

Advantageously, the present principles provide methods and apparatus to design or choose the alternative transforms in the transform selection method in order to avoid the appearance of the "windowed pattern" artifacts. To the best of our knowledge, the "windowed pattern" or related artifacts arising from the use of a transform selection method (also known as switchable transforms or alternative transforms) has not been identified in other works.

The fifth and other prior art approaches design alternate transforms that are computationally simple or that obtain good objective results. However, such prior art approaches have not identified the patterns introduced by the method, assessed the subjective quality and, consequently, proposed transforms tackling the patterns as is proposed in accordance with the present principles.

In accordance with the present principles, the transform selection method uses one transform selected from a set of transforms for each block. The transform to use is usually determined by checking the rate-distortion performance of each transform in the set and chosen the one giving the best performance. The encoder signals the selection to the decoder. FIG. 3 shows an example of a video encoder 300 with transform selection, and FIG. 4 shows an example of a video decoder 400 for use with the video encoder 300 of FIG. 3. The video decoder 400 uses the inverse transform that corresponds to the selected transform at the video encoder 300.

Given the prevalent use of the DCT and that the DCT has been widely shown to perform very well in video coding, we recognize that it is reasonable to include a DCT as one of the transforms in the set. Then, we obtain a second (or more) transform that works well along with the DCT within the transform selection tool.

The best possible second transform (to work with the DCT) can be determined using the KLT and sparsity-based algorithms. The KLT is an optimal linear transform given the data. A previous line of work is directed to maximizing the PSNR performance. However, when doing subjective quality assessment, it is noticeable that transforms giving good PSNR improvements obtained by these methods also introduce annoying artifacts at low bit rates. These artifacts are presented as windowed patterns on the reconstructed video. Studying the issue further, it can be found that these artifacts appear for two reasons:

1. At low bit rates, it is very often the case that only one transformed coefficient is not quantized to 0. This coefficient usually is the lowest frequency coefficient. If this occurs in contiguous blocks, then the pattern of the lowest frequency coefficient appears in all of the contiguous blocks, creating the windowed pattern.
2. For the DCT case, the lowest frequency coefficient is the direct current (DC) component, that is, just a square or block pattern. Therefore, at low bit rates, coding one non-zero coefficient leads to the blocking artifact. These artifacts are mostly removed afterwards by the deblocking filter (such as, e.g., deblocking filter 165 in FIG. 1). Such a filter does not exist for removing the windowed artifacts described herein.

The present principles propose to solve the aforementioned problem by modifying the second transform so that it is tuned to the deblocking filter that is applied afterwards to the reconstructed data.

In one embodiment, we impose the lowest frequency component of the second transform to be very smooth so that any window artifact that it creates is close enough to the block artifact. In this situation, the deblocking filter can take care of removing these artifacts and there is no need for further filters or additional processing. FIGS. 3 and 4 are block diagrams respectively showing an encoder and decoder which illustrate this embodiment if we chose transform one to be the DCT and the rest of the transforms (2 to n) to be KLT (or some other transform) and forcing the first basis vectors of the KLT to a smoothness constraint.

In accordance with the present principles, a block transform T can be represented by a matrix. When applied to one-dimensional (1-D) input data x, block transform T generates an output y (of transformed coefficients). This operation is stated as follows: y=T*x. Matrix T is composed of n rows, each of which is called a vector basis. The transformed coefficients y are the representation of the data x in the transformed domain of the vector bases. In video coding, usually the first basis vector (top vector in T) is the one with lowest frequency components. For example, the DCT lowest frequency component is the DC component, that is, a constant. Then, in video coding, the transform coefficients are quantized, scanned, and entropy coded. Clearly, the order of the vector bases is not strict in the sense that it could be changed and if the entropy coding is changed accordingly, then the final coded bitstream should not be affected. However, it is a convention in the art to put the lowest frequency vector, the one with less variation and closer to a constant, as the first vector in the block transform T.

The frequency component is commonly understood to be the frequency distribution of the vector in the Fourier transform domain. The Fourier transform of a smooth signal (or vector) has most of the energy in the lower frequencies, while a signal with high variability has energy distributed in all the frequencies (or more in the high frequencies).

In another embodiment, the video data is used to obtain the optimal KLT. Then, the total variation of the first vector basis is forced to be below a threshold. Total variation is the sum of the absolute value of the difference of each coefficient minus the next coefficient. After that, the rest of the vectors are modified in order to force the transform to be orthogonal again. The resulting transform is used in the transform selection method.

In another embodiment, the first vector basis of the KLT is forced to be very smooth by imposing a constraint on the energy of its Fourier transform below a certain frequency. The constraint is that the energy has to be above a threshold value. The rest of the vectors are modified so that the transform is orthogonal. In a similar embodiment, the first vector basis is forced to be a discrete cosine with frequency below a threshold.

In another embodiment, a transform is selected as a second transform, but imposing a vector basis to be constant (i.e., flat).

Figure 5:
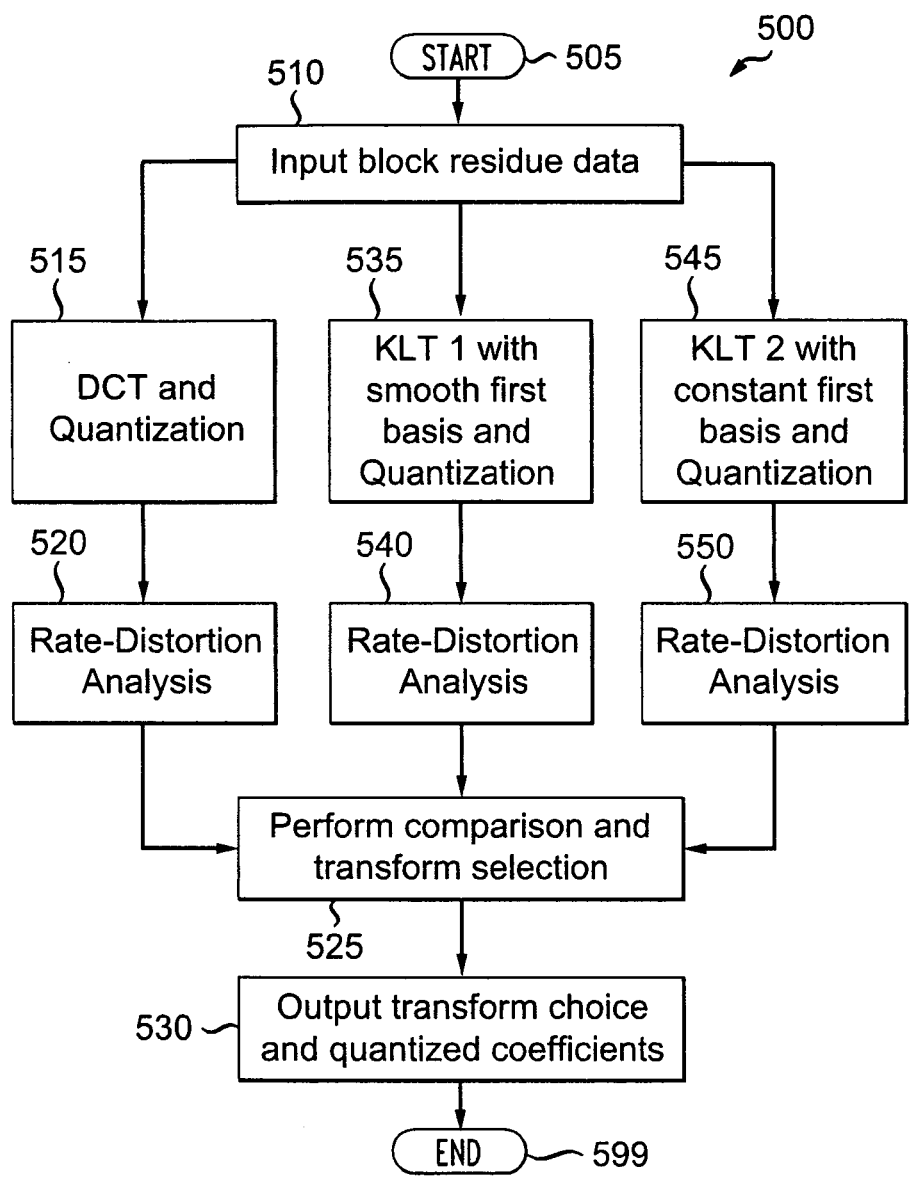
FIG. 5 is a flow diagram showing an exemplary method for encoding block residue data for a picture using transform selection, in accordance with an embodiment of the present principles.

Turning to FIG. 5, an exemplary method for encoding block residue data for a picture using transform selection is indicated generally by the reference numeral 500. The method 500 includes a start block that passes control to a function block 510. The function block 510 receives block residue data, and passes control to a function block 515, a function block 535, and a function block 545. The function block 515 transforms and quantizes the block residue data using the discrete cosine transform (DCT), and passes control to a function block 520. The function block 535 transforms and quantizes the block residue data using KLT 1 with a smooth first basis, and passes control to a function block 540. The function block 545 transforms and quantizes the block residue data using KLT 2 with a constant first basis, and passes control to a function block 550. The function block 520 performs a rate-distortion (RD) analysis based on an output of function block 515, and passes control to a function block 525. The function block 540 performs a rate-distortion (RD) analysis based on an output of the function block 535, and passes control to the function block 525. The function block 550 performs a rate-distortion (RD) analysis based on an output of the function block 545, and passes control to the function block 525. The function block 525 performs a comparison of the results of the rate-distortion analysis performed by function blocks 520, 540, and 550, selects a particular one of the transforms corresponding to function blocks 515, 535, and 545 based on such results, and passes control to a function block 530. The function block 530 outputs the transform choice and quantized coefficients, and passes control to an end block 599.

Figure 6:
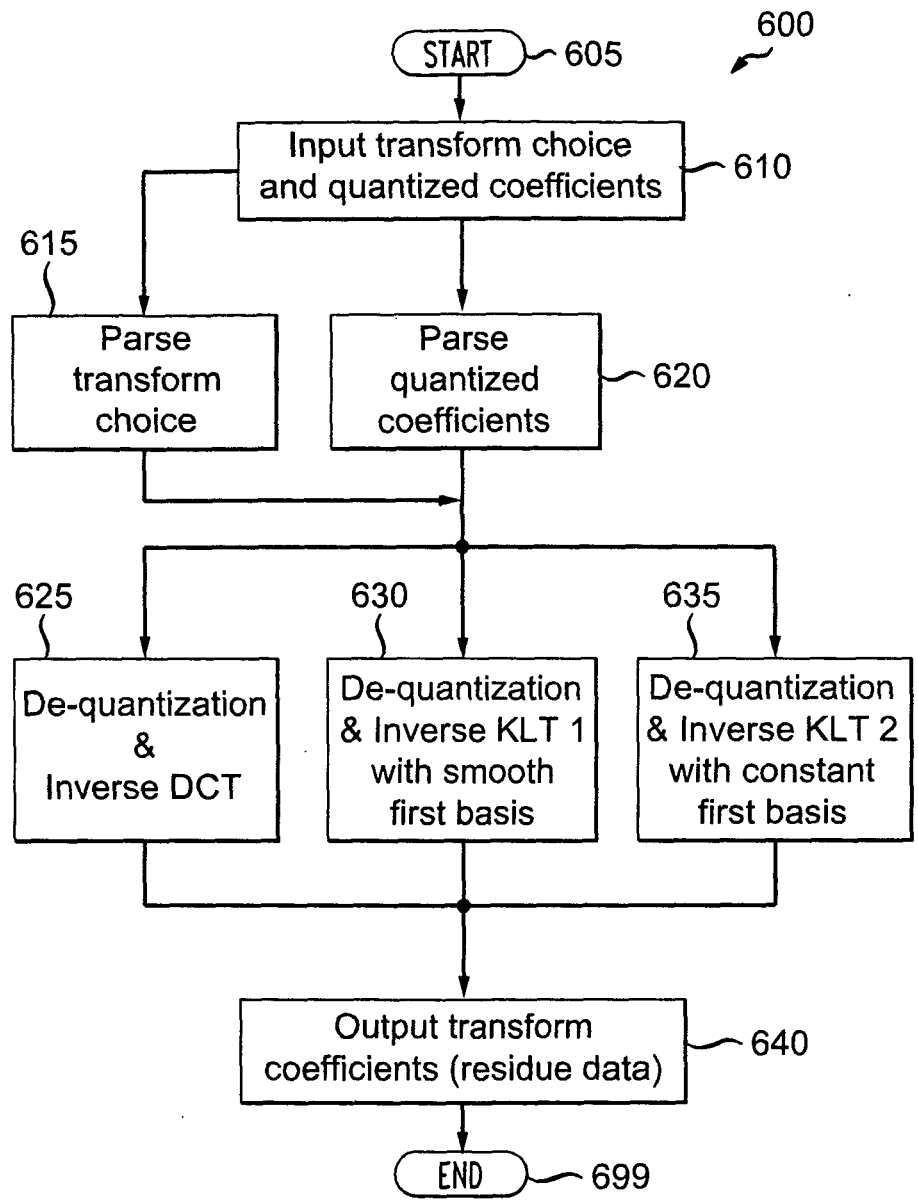
FIG. 6 is a flow diagram showing an exemplary method for decoding block residue data for a picture using transform selection, in accordance with an embodiment of the present principles.

Turning to FIG. 6, an exemplary method for decoding block residue data for a picture using transform selection is indicated generally by the reference numeral 600. The method 600 includes a start block 605 that passes control to a function block 610. The function block 610 receives a transform choice and quantized coefficients, and passes control to a function block 615 and a function block 620. The function block 615 parses (and, thus, determines) the transform choice, and passes control to a corresponding one of a function block 625, a function block 630, and a function block 635. The function block 620 parses (and, thus, determines) the quantized coefficients, and passes control to a corresponding one of the function block 625, the function block 630, and the function block 635. The function block 625 performs de-quantization and inverse transformation based on the discrete cosine transform (DCT), and passes control to a function block 640. The function block 630 performs de-quantization and inverse transformation based on KLT 1 with a smooth first basis, and passes control to the function block 640. The function block 635 performs de-quantization and inverse transformation based on KLT 2 with a constant first basis, and passes control to the function block 640. The function block 640 outputs the inverse transform coefficients (residue data), and passes control to an end block 699.

It is to be appreciated that the embodiments of FIGS. 5 and 6 use three transforms in the transform selection method. The first transform is the DCT. The second transform is one KLT in which the first basis vector is forced to be smooth. The third transform is another KLT in which the first basis vector is forced to be constant.

A description will now be given of some of the many attendant advantages/features of the present invention, some of which have been mentioned above. For example, one advantage/feature is an apparatus having a video encoder for encoding at least a block in a picture by selecting a particular transform from at least a first transform and a second transform that is different than the first transform, and applying the particular transform to a residue of the block, wherein transform coefficients for the second transform are selected responsive to a deblocking filter that is present in the video encoder.

Another advantage/feature is the apparatus having the video encoder as described above, wherein the transform coefficients correspond to a first basis vector of the second transform.

Yet another advantage/feature is the apparatus having the video encoder wherein the transform coefficients correspond to a first basis vector of the second transform as described above, wherein a smoothness constraint is imposed on the first basis vector.

Still another advantage/feature is the apparatus having the video encoder wherein the transform coefficients correspond to a first basis vector of the second transform as described above, wherein a variation of the transform coefficients corresponding to the first basis vector is constrained below a specified threshold value.

Moreover, another advantage/feature is the apparatus having the video encoder wherein the transform coefficients correspond to a first basis vector of the second transform as described above, wherein an energy of a Fourier transform below a given frequency is above a specified threshold, the Fourier transform corresponding to the second transform.

Further, another advantage/feature is the apparatus having the video encoder wherein the transform coefficients correspond to a first basis vector of the second transform as described above, wherein the transform coefficients corresponding to the first vector basis are constant.

Also, another advantage/feature is the apparatus having the video encoder as described above, wherein the first transform is a Discrete Cosine Transform.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding at least a block in a picture by selecting a particular transform from at least a first transform and a second transform that is different than the first transform, and applying the particular transform to a residue of the block, wherein transform coefficients for the second transform are selected so as to be tuned to a deblocking filter that is present in the video encoder and wherein the lowest frequency component of the second transform is smooth.

2. The apparatus of claim 1, wherein the transform coefficients correspond to a first basis vector of the second transform.

3. The apparatus of claim 2, wherein a smoothness constraint is imposed on the first basis vector.

4. The apparatus of claim 2, wherein a variation of the transform coefficients corresponding to the first basis vector is constrained below a specified threshold value.

5. The apparatus of claim 2, wherein an energy of a Fourier transform below a given frequency is above a specified threshold, the Fourier transform corresponding to the second transform.

6. The apparatus of claim 2, wherein the transform coefficients corresponding to the first vector basis are constant.

7. The apparatus of claim 1, wherein the first transform is a Discrete Cosine Transform.

8. In a video encoder, a method, comprising:
encoding at least a block in a picture by selecting a particular transform from at least a first transform and a second transform that is different than the first transform, and applying the particular transform to a residue of the block, wherein transform coefficients for the second transform are selected so as to be tuned to a deblocking filter that is present in the video encoder and wherein the lowest frequency component of the second transform is smooth.

9. The method of claim 8, wherein the transform coefficients correspond to a first basis vector of the second transform.

10. The method of claim 9, wherein a smoothness constraint is imposed on the first basis vector.

11. The method of claim 9, wherein a variation of the transform coefficients corresponding to the first basis vector is constrained below a specified threshold value.

12. The method of claim 9, wherein an energy of a Fourier transform below a given frequency is above a specified threshold, the Fourier transform corresponding to the second transform.

13. The method of claim 9, wherein the transform coefficients corresponding to the first vector basis are constant.

14. The method of claim 8, wherein the first transform is a Discrete Cosine Transform.

15. An apparatus, comprising:
a video decoder for decoding at least a block in a picture by receiving transform coefficients and a transform indicator for the block, the transform indicator for indicating which of at least a first transform and a second transform that is different than the first transform was used to encode the block, applying one of the first and the second transforms as indicated by the transform indicator to transform coefficients, wherein transform coefficients for the second transform are determined so as to be tuned to a deblocking filter that is present in the video decoder and wherein the lowest frequency component of the second transform is smooth.

16. The apparatus of claim 15, wherein the transform coefficients correspond to a first basis vector of the second transform.

17. The apparatus of claim 16, wherein a smoothness constraint is imposed on the first basis vector.

18. The apparatus of claim 16, wherein a variation of the transform coefficients corresponding to the first basis vector is constrained below a specified threshold value.

19. The apparatus of claim 16, wherein an energy of a Fourier transform below a given frequency is above a specified threshold, the Fourier transform corresponding to the second transform.

20. The apparatus of claim 16, wherein the transform coefficients corresponding to the first vector basis are constant.

21. The apparatus of claim 15, wherein the first transform is a Discrete Cosine Transform.

22. In a video decoder, a method, comprising:
decoding at least a block in a picture by receiving transform coefficients and a transform indicator for the block, the transform indicator for indicating which of at least a first transform and a second transform that is different than the first transform was used to encode the block, applying one of the first and the second transforms as indicated by the transform indicator to transform coefficients, wherein transform coefficients for the second transform are determined so as to be tuned to a deblocking filter that is present in the video decoder and wherein the lowest frequency component of the second transform is smooth.

23. The method of claim 22, wherein the transform coefficients correspond to a first basis vector of the second transform.

24. The method of claim 23, wherein a smoothness constraint is imposed on the first basis vector.

25. The method of claim 23, wherein a variation of the transform coefficients corresponding to the first basis vector is constrained below a specified threshold value.

26. The method of claim 23, wherein an energy of a Fourier transform below a given frequency is above a specified threshold, the Fourier transform corresponding to the second transform.

27. The method of claim 23, wherein the transform coefficients corresponding to the first vector basis are constant.

28. The method of claim 15, wherein the first transform is a Discrete Cosine Transform.

29. A non-transitory computer readable storage media having video signal data encoded thereupon, comprising:
at least a block in a picture encoded by selecting a particular transform from at least a first transform and a second transform that is different than the first transform, and applying the particular transform to a residue of the block, wherein transform coefficients for the second transform are determined so as to be tuned to a deblocking filter that is present in the video decoder and wherein the lowest frequency component of the second transform is smooth.

* * * * *